(12) United States Patent
Toya

(10) Patent No.: US 8,746,834 B2
(45) Date of Patent: Jun. 10, 2014

(54) IMAGE RECORDING DEVICE AND IMAGE RECORDING METHOD

(75) Inventor: Akihiro Toya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 434 days.

(21) Appl. No.: 13/177,722

(22) Filed: Jul. 7, 2011

(65) Prior Publication Data

US 2012/0013956 A1    Jan. 19, 2012

(30) Foreign Application Priority Data

Jul. 16, 2010    (JP) ................................. 2010-162021

(51) Int. Cl.
*B41J 29/38*    (2006.01)
*B41J 2/01*    (2006.01)

(52) U.S. Cl.
USPC ........................................... 347/17; 347/104

(58) Field of Classification Search
USPC ............................... 347/16, 17, 102, 104, 105
See application file for complete search history.

(56) References Cited

U.S. PATENT DOCUMENTS

| | | | |
|---|---|---|---|
| 4,952,944 A * | 8/1990 | Inui et al. | 346/25 |
| 5,502,464 A * | 3/1996 | Takahashi et al. | 346/25 |
| 5,625,398 A * | 4/1997 | Milkovits et al. | 347/104 |
| 6,511,172 B2 * | 1/2003 | Tanno et al. | 347/104 |
| 6,813,846 B2 * | 11/2004 | Yoshida | 34/443 |
| 7,396,122 B2 * | 7/2008 | Masumi et al. | 347/102 |
| 7,703,912 B2 * | 4/2010 | Sootome et al. | 347/104 |
| 8,162,470 B2 * | 4/2012 | Kanai et al. | 347/102 |
| 2012/0050435 A1 * | 3/2012 | Sugiyama et al. | 347/102 |

FOREIGN PATENT DOCUMENTS

JP    2005-246908 A    9/2005
JP    2010-131891 A    6/2010

* cited by examiner

*Primary Examiner* — Anh T. N. Vo
(74) *Attorney, Agent, or Firm* — Global IP Counselors, LLP

(57) ABSTRACT

An image recording device includes a conveying part that conveys a medium along a conveying path, a first medium support part that supports a region of the medium positioned in an image recording area on the conveying path and heats the region, a second medium support part disposed in an upstream area from the image recording area on the conveying path, and supports an upstream region of the medium positioned in the upstream area and heats the upstream region, and a temperature control part that controls a temperature of the first medium support part and a temperature of the second medium support part so that the temperature of the second medium support part corresponding to the upstream region is lower than the temperature of the first medium support part corresponding to the region.

9 Claims, 3 Drawing Sheets

IMAGE RECORDING DEVICE AND IMAGE RECORDING METHOD

CROSS-REFERENCE TO RELATED APPLICATIONS

This application claims priority to Japanese Patent Application No. 2010-162021 filed on Jul. 16, 2010. The entire disclosure of Japanese Patent Application No. 2010-162021 is hereby incorporated herein by reference.

BACKGROUND

1. Technical Field

The present invention relates to an image recording device and an image recording method.

2. Related Art

Image recording devices are known which dry ink discharged onto a medium on a platen from nozzles provided to a head by heating the medium (Japanese Laid-Open Patent Application Publication No. 2005-246908, for example).

SUMMARY

In this image recording device, when head cleaning is performed, for example, there are cases in which wrinkles occur in the medium.

The present invention was devised in view of such circumstances, and an object thereof is to minimize the occurrence of wrinkles in the medium.

An image recording device according to one aspect of the present invention includes a conveying part, a first medium support part, a second medium support part, and a temperature control part. The conveying part is configured and arranged to convey a medium along a conveying path. The first medium support part is configured and arranged to support a region of the medium positioned in an image recording area on the conveying path and to heat the region. The second medium support part is disposed in an upstream area from the image recording area with respect to a conveying direction of the medium, and configured and arranged to support an upstream region of the medium positioned in the upstream area and to heat the upstream region. The temperature control part is configured and arranged to control a temperature of the first medium support part and a temperature of the second medium support part so that the temperature of the second medium support part corresponding to the upstream region is lower than the temperature of the first medium support part corresponding to the region.

Other characteristics of the present invention are made clear by the content of the present specification and the accompanying drawings.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
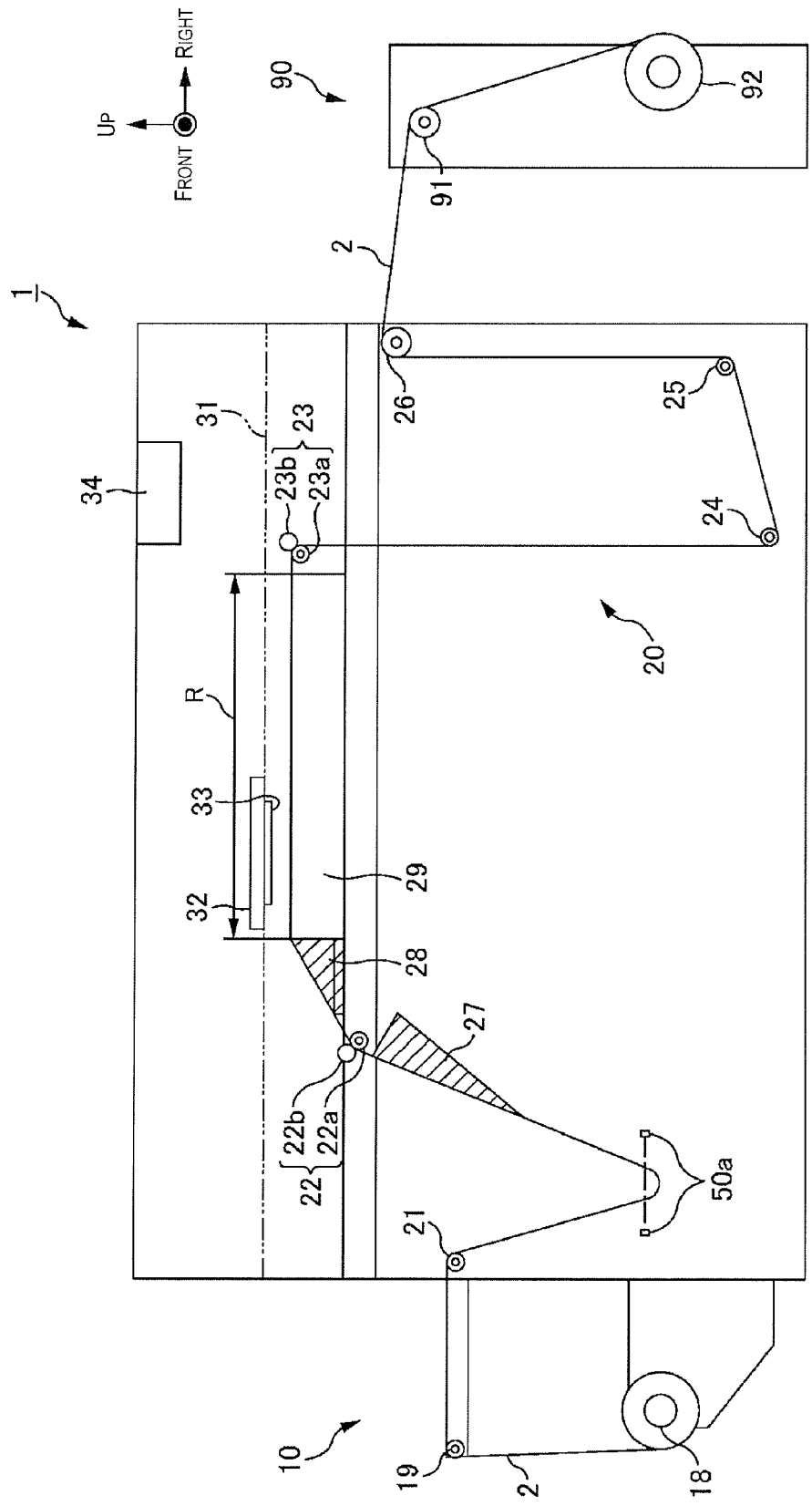
FIG. 1 is a schematic diagram of an image recording device 1.

The following matters at least will be made clear from the content of the present specification and the accompanying drawings.

An image recording device according to the embodiment includes a conveying part, a first medium support part, a second medium support part, and a temperature control part. The conveying part is configured and arranged to convey a medium along a conveying path. The first medium support part is configured and arranged to support a region of the medium positioned in an image recording area on the conveying path and to heat the region. The second medium support part is disposed in an upstream area from the image recording area with respect to a conveying direction of the medium, and configured and arranged to support an upstream region of the medium positioned in the upstream area and to heat the upstream region. The temperature control part is configured and arranged to control a temperature of the first medium support part and a temperature of the second medium support part.

According to such an image recording device, the occurrence of wrinkles in the medium can be minimized.

The image recording device may further includes a heat supply part configured and arranged to supply the first medium support part with heat to be applied to the medium by the first medium support part. The second medium support part may have a downstream end part disposed on a downstream side with respect to the conveying direction of the medium, the downstream end part contacting the first medium support part to receive heat supplied to the first medium support part by the heat supply part to heat the medium by the second medium support part.

According to such an image recording device, the occurrence of wrinkles in the medium can be minimized, and heat can be conducted without providing a separate heat supply part to the second medium support part.

The image recording device may further include a third medium support part. The conveying part may have a pair of conveying rollers disposed upstream of the image recording area with the conveying rollers being respectively disposed above and below the medium. The third medium support part may be disposed in an opposite area that is opposite from the second medium support part with respect to the conveying rollers, and configured and arranged to support an opposite region of the medium positioned in the opposite area to heat the opposite region, the third medium support part being configured and arranged to apply less heat to locations separated further from the image recording area.

According to such an image recording device, the occurrence of wrinkles in the medium can be more reliably minimized, and the conveying rollers can be disposed nearer to the image recording area.

The image recording device may further includes an additional heat supply part configured and arranged to supply the third medium support part with heat to be applied to the medium by the third medium support part, the additional heat supply part being a different heat supply part from the heat supply part. The third medium support part may be configured and arranged to heat the medium by receiving the heat supplied by the additional heat supply part from a downstream end with respect to the conveying direction.

According to such an image recording device, the heat created by the second heat supply part which is different from the first heat supply part can be conducted from the downstream end in the third medium support part toward an upstream end.

In this image recording device, the second medium support part and the third medium support part may be shaped so as to progressively decrease in thickness away from the image recording area.

According to such an image recording device, the medium can be conveyed smoothly while the occurrence of wrinkles in the medium is minimized.

In this image recording device, a temperature difference between a downstream end and an upstream end in the conveying direction in the third medium support part may be greater than a temperature difference between a downstream end and an upstream end in the conveying direction in the second medium support part.

According to such an image recording device, the occurrence of wrinkles in the medium can be minimized more reliably.

In this image recording device, the conveying part may have a mechanism configured and arranged to slacken and convey the medium in an area upstream of the third medium support part in the conveying path.

According to such an image recording device, the occurrence of wrinkles can be more reliably minimized in regions of the roll paper positioned in the area upstream of the third medium support part.

An image recording method according to another aspect includes recording an image on a medium using an image recording device. The image recording device includes: a conveying part configured and arranged to convey a medium along a conveying path; a first medium support part configured and arranged to support a region of the medium positioned in an image recording area on the conveying path and to heat the region; and a second medium support part disposed in an upstream area from the image recording area on the conveying path, and configured and arranged to support an upstream region of the medium positioned in the upstream area and to heat the upstream region so that a temperature of the second medium support part corresponding to the upstream region is lower than a temperature of the first medium support part corresponding to the region.

According to such an image recording method, the occurrence of wrinkles in the medium can be minimized.

EMBODIMENTS

An image recording device 1 according to an embodiment of the present invention is described hereinbelow.

Structural Example of Image Recording Device 1

Figure 2:
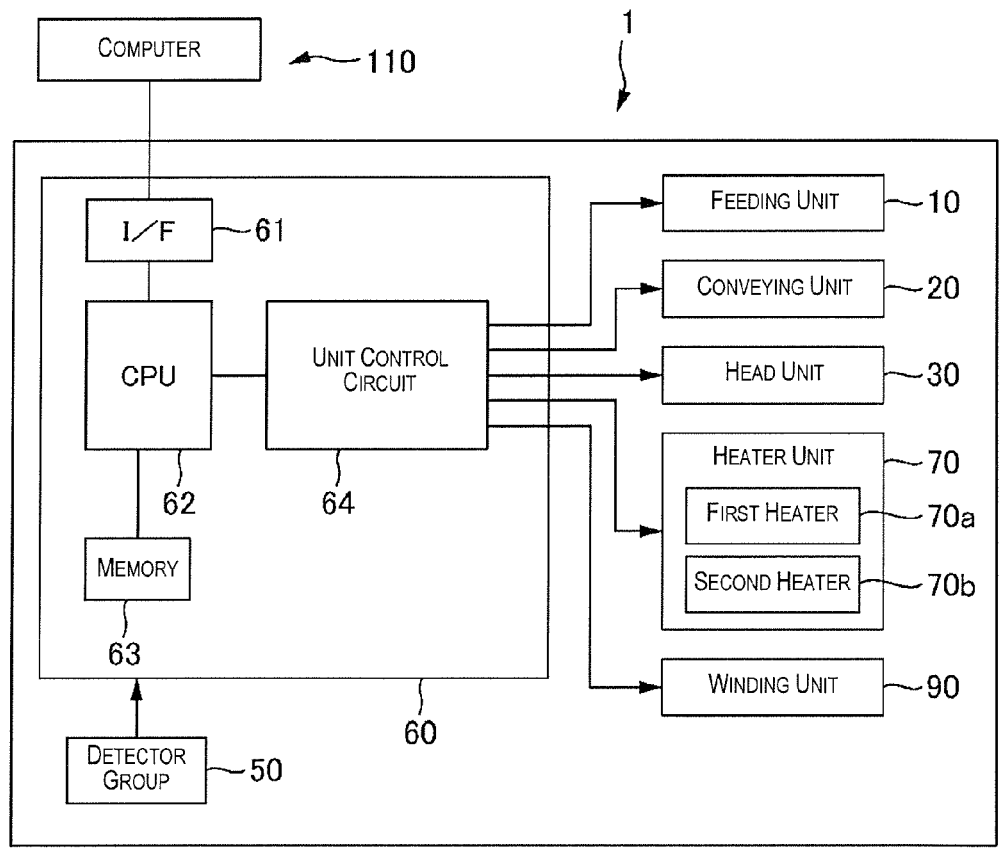
FIG. 2 is a block diagram of the image recording device 1.

A structural example of the image recording device 1 is described using FIGS. 1 and 2. FIG. 1 is a schematic cross-sectional view of the image recording device 1. FIG. 2 is a block diagram of the image recording device 1.

In the following description, when the terms "up-down direction" and "left-right direction" are used, they reference the directions indicated by the arrows in FIG. 1. When the term "forward-backward direction" is used, it indicates a direction orthogonal to the paper surface in FIG. 1.

The description in the present embodiment uses roll paper (continuous paper) as the medium on which the image recording device 1 records an image.

The image recording device 1 according to the present embodiment has a conveying unit 20 as an example of a conveying part, and along the conveying path whereby the conveying unit 20 conveys roll paper 2 has a feeding unit 10, a wrinkle prevention plate 27 as an example of the third medium support part, a wrinkle prevention plate 28 as an example of the second medium support part, a platen 29 as an example of the first medium support part, and a winding unit 90, as shown in FIGS. 1 and 2. Furthermore, the image recording device 1 has a head unit 30 for performing printing in an image recording area R on the conveying path, a heater unit 70 as an example of a heat supply part, a controller 60 which controls these units and other components and enables the action of the image recording device 1, and detector group 50.

The feeding unit 10 is used to feed the roll paper 2 to the conveying unit 20. This feeding unit 10 has a winding shaft 18 around which the roll paper 2 and which is rotatably supported, and a relay roller 19 for leading the roll paper 2 to the conveying unit 20 after the roll paper 2 is unreeled from the winding shaft 18 and wrapped over the relay roller 19.

The conveying unit 20 is used to convey the roll paper 2 sent by the feeding unit 10 along the preset conveying path. The conveying unit 20 has a relay roller 21 positioned horizontally to the right of the relay roller 19, a first conveying roller 22 positioned above and to the right of the relay roller 21 (upstream in the conveying direction from the platen 29), a second conveying roller 23 positioned above and to the right of the first conveying roller 22 (downstream in the conveying direction from the platen 29), a reversal roller 24 positioned vertically below the second conveying roller 23, a relay roller 25 positioned to the right of the reversal roller 24, and a feed-out roller 26 positioned above the relay roller 25.

The relay roller 21 is a roller on which the roll paper fed from the relay roller 19 wraps and slackens from the left and downward.

The first conveying roller 22 has a first drive roller 22a driven by a motor (not shown), and a first driven roller 22b disposed so as to face the first drive roller 22a from the other side of the roll paper 2. The first conveying roller 22 is a roller for pulling up the roll paper 2 that has been slackened downward by the relay roller 21, and conveying the roll paper 2 to the image recording area R facing the platen 29. The first conveying roller 22 is designed to temporarily stop the conveying during the timeframe in which image printing is being performed on the region of the roll paper over the image recording area R. The drive control of the controller 60 causes the first driven roller 22b to rotate along with the rotational driving of the first drive roller 22a, whereby the conveyed amount of the roll paper 2 (the length of the roll paper region) positioned on the platen is adjusted.

The conveying unit 20 has a mechanism for slackening and conveying downward the region of the roll paper 2 wrapped between the relay roller 21 and the first conveying roller 22. This slackening of the roll paper is observed by the controller 60 based on a detection signal from a sensor 50a for detecting slackening. Specifically, when the sensor 50a detects a slackened region of the roll paper between the relay roller 21 and the first conveying roller 22, it means that an appropriately large amount of tensile force is being applied to this region, and the conveying unit 20 can therefore convey the roll paper in a slackened state. When the sensor 50a does not detect a slackened region of the roll paper, it means that an excessively large amount of tensile force is being applied to this region, the conveying of the roll paper by the conveying unit 20 is therefore temporarily stopped, and the tensile force is adjusted to an appropriate amount.

Thus, slackening the roll paper makes it possible to move the roll paper a small amount within a predetermined range in the width direction (the forward-backward direction) and the conveying direction, and the occurrence of wrinkles can be minimized in the region of the roll paper that is upstream in the conveying direction from the wrinkle prevention plate 27. The occurrence of wrinkles will be described hereinafter.

The second conveying roller 23 has a second drive roller 23a driven by a motor (not shown), and a second driven roller 23b disposed so as to face the second drive roller 23a from the other side of the roll paper 2. The second conveying roller 23 is a roller which conveys the region of the roll paper 2 where an image has been recorded by the head unit 30, and the region is conveyed vertically downward after being conveyed horizontally to the right along the support surface of the platen 29. The conveying direction of the roll paper 2 is thereby shifted. The second driven roller 23b is rotated along with the rotatable driving of the second drive roller 23a by the drive control of the controller 60, thereby adjusting the predetermined tensile force applied to the region of the roll paper positioned on the platen.

The reversal roller 24 is a roller on which the roll paper 2 sent from the second conveying roller 23 is wrapped from the upper left and conveyed upward and to the right.

The relay roller 25 is a roller on which the roll paper 2 sent from the reversal roller 24 is wrapped from the lower left and conveyed upward.

The roll paper 2 sent from the relay roller 25 is wrapped on the feed-out roller 26 from the lower left and fed out to the winding unit 90.

Thus, the roll paper 2 moves sequentially through the rollers, whereby a conveying path for conveying the roll paper 2 is formed. The roll paper 2 is conveyed by the conveying unit 20 intermittently along this conveying path at area units corresponding to the image recording area R.

The head unit 30 is used to discharge ink onto the region of the roll paper 2 fed by the conveying unit 20 into the image recording area R (onto the platen 29) along the conveying path. As shown in FIG. 1, the head unit 30 has a guide rail 31 extending in the left-right direction (shown by a double-dotted line), a carriage 32 supported to be capable of moving back and forth in the left-right direction (the movement direction) along the guide rail 31, a head 33 supported on the underside of the carriage 32, and a valve unit 34.

The valve unit 34 is for temporarily retaining ink, and is connected to the head 33 via an ink supply tube (not shown).

The head 33 has a plurality of nozzles for discharging ink on its underside, and image printing is performed by ink supplied from the valve unit 34 being discharged from the nozzles onto the region of the roll paper 2 that has been conveyed to and stopped on the platen 29.

In the present embodiment, when head cleaning is performed after image printing, the head 33 moves integrally with the carriage 32 upstream in the conveying direction (upstream in the conveying direction from the platen 29) along the guide rail 31 and stops in a position (not shown) where head cleaning is performed. Therefore, during head cleaning the head 33 is no longer located above the image recording area R (the platen 29).

The platen 29 is for supporting the region of the roll paper 2 positioned in the image recording area R on the conveying path and for heating the region. The platen 29 is provided corresponding to the image recording area R on the conveying path as shown in FIG. 1, and is disposed in an area along the conveying path between the first conveying roller 22 and the second conveying roller 23. The platen 29 can heat this region of the roll paper 2 by being supplied with heat created by the heater unit 70.

The wrinkle prevention plates 27, 28 are disposed in an area upstream in the conveying direction from the image recording area R, and are for supporting the region of the roll paper 2 positioned in this upstream area and for heating this region. The wrinkle prevention plates 27, 28 can minimize the occurrence of wrinkles in the roll paper 2 by adding more heat to the roll paper 2 in locations nearer to the platen 29 (and by adding less heat to the roll paper 2 in locations farther from the image recording area R). In the present embodiment, the wrinkle prevention plate 27 is disposed on the conveying path such that its end that is downstream in the conveying direction is in contact with the platen 29, as shown in FIG. 1. The wrinkle prevention plate 28 is disposed along the conveying path on the side of the wrinkle prevention plate 27 opposite from the first conveying roller 22. These specific configurations will be described hereinafter.

The heater unit 70 is for heating the roll paper 2, and the heater unit 70 has a first heater 70a and a second heater 70b.

The first heater 70a has a nichrome wire, and is configured with the nichrome wire disposed inside the platen 29 so as to be a certain distance from the support surface of the platen 29. Therefore, in the first heater 70a, the nichrome wire itself generates heat due to being supplied with electricity, and heat can be conducted to the region of the roll paper 2 positioned on the support surface of the platen 29. Since the first heater 70a is configured with a nichrome wire installed throughout the entire platen 29 (see FIG. 4), heat can be uniformly conducted to the region of the roll paper 2 on the platen 29. In the present embodiment, the region of the roll paper 2 on the platen is uniformly heated so that the temperature of the region of the roll paper 2 reaches 45° C. Since the region of the roll paper 2 positioned on the platen 29 is warmed uniformly by the heat of the first heater 70a as described above, there is no clear temperature division. Consequently, wrinkles do not occur in this region of the roll paper.

Figure 5:
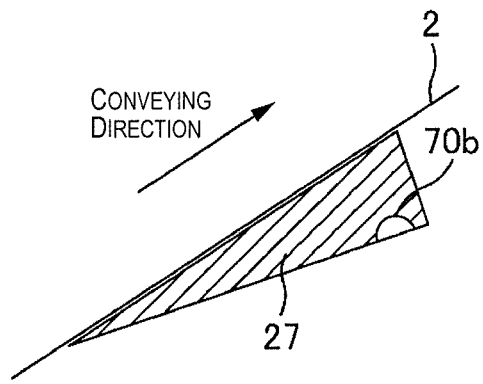
FIG. 5 is a schematic cross-sectional view showing a structural example of the wrinkle prevention plate 27.

The second heater 70b has a nichrome wire, and is configured with this nichrome wire installed only in the downstream end in the conveying direction in the wrinkle prevention plate 27 (FIG. 5). Therefore, in the second heater 70b, the nichrome wire itself generates heat due to being supplied with electricity, and heat can be conducted to the region of the roll paper 2 positioned on the wrinkle prevention plate 27 so that the amount of heat gradually decreases upstream in the conveying direction. In the present embodiment, the region of the roll paper 2 is heated so that the temperature of the region of the roll paper 2 on the wrinkle prevention plate 27 gradually decreases from 43° C. o 35° C. from the downstream end to the upstream end in the conveying direction.

The winding unit 90 is for winding up the roll paper 2 send by the conveying unit 20 (the roll paper that has undergone the image printing process). The winding unit 90 has a relay roller 91 on which the roll paper 2 is wrapped from the upper left and conveyed downward and to the right after the roll paper 2 is sent from the feed-out roller 26, and a winding drive shaft 92 which is rotatably supported and which winds up the roll paper 2 sent from the relay roller 91.

The controller 60 is a control unit for performing control on the image recording device 1. This controller 60 has an interface 61, a CPU 62, a memory 63, and a unit control circuit 64, as shown in FIG. 2. The interface 61 is for conducting data transmission between a host computer 110 as an external device and the image recording device 1. The CPU 62 is a computation processing device for performing control on the entire image recording device 1. The memory 63 is for ensuring areas for storing the programs of the CPU 62, operational areas, and the like. The CPU 62 controls the units through the unit control circuit 64 according to the programs stored in the memory 63.

The detector group 50 is for observing conditions in the image recording device 1, and this group has, for example, rotary encoders attached to the conveying rollers and used to control conveying of the medium and other actions, paper detection sensors for detecting whether or not there is a conveyed medium, and the like.

Occurrence of Wrinkles

Figure 3A:
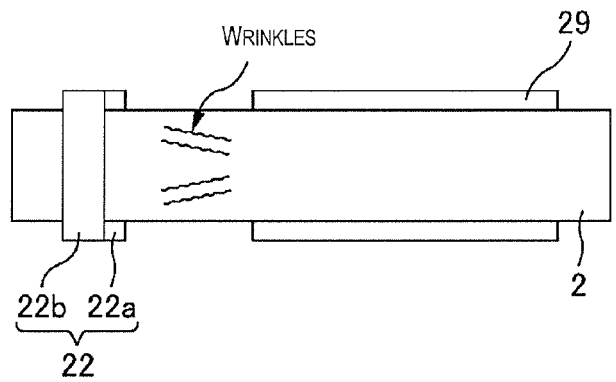
FIGS. 3A and 3B are drawings describing the occurrence of wrinkles.
Figure 3B:
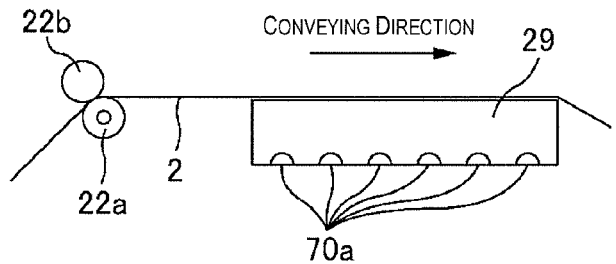

The occurrence of wrinkles in the roll paper is described using FIGS. 3A and 3B. FIGS. 3A and 3B are drawings for describing the occurrence of wrinkles while showing an image recording device having no wrinkle prevention plates.

Cleaning of the head is performed so that ink is discharged appropriately either at the start of the image recording action or at a predetermined timing such as the elapse of a certain time following the previous cleaning.

In this head cleaning, a process of removing ink or waste adhering to the nozzle placement surface is performed in order to resolve nozzle clogging, for example.

One cleaning action requires a time of approximately three to ten minutes.

Thus, when the roll paper 2 remains on the platen 29 for a long period of time when head cleaning is performed, heat continues to be supplied to the roll paper 2 by the first heater 70*a*.

At this time, the first heater 70*a* is originally intended to evaporating the moisture in the ink discharged on the roll paper and promoting drying, but the first heater 70*a* also evaporates even the moisture in the roll paper itself.

Since the roll paper 2 has both regions where large amounts of moisture evaporate and regions where it does not, the different regions have different amounts of fiber contraction. Specifically, although the region of the roll paper 2 positioned on the platen 29 is heated uniformly by the first heater 70*a*, the region upstream in the conveying direction from the platen 29 is not heated uniformly, and there is therefore variation in the manner in which heat is transferred from the first heater 70*a*.

As a result, since the regions of the roll paper have different amounts of fiber contraction, wrinkles occur in the roll paper. Wrinkles occur particularly in the region of the roll paper where there is a clear temperature division, i.e., within the area on the conveying path, the region of the roll paper that is positioned in the area between the first conveying roller 22 and the platen 29 (see FIGS. 3A and 3B).

Therefore, when the region where wrinkles occur in the roll paper is conveyed onto the platen 29 by the conveying unit 20, the gap between the head 33 and the roll paper positioned on the platen 29 is smaller than usual. As a result, there is contact between the roll paper 2 and the head 33, as well as printing discrepancies.

As a countermeasure to this, the image recording device 1 in the present embodiment is configured having a second medium support part for supporting the region of the roll paper 2 positioned in the area upstream from the image recording area R in the conveying path and for heating this region, the second medium support part being disposed in this upstream area, wherein the second medium support part adds less heat to locations further away from the image recording area R of the second medium support part. Therefore, the second medium support part can have a temperature slope such that the temperature gradually changes from high to low, and regions where there is a clear temperature division in the roll paper 2 can be reduced. As a result, the occurrence of wrinkles in the roll paper can be minimized.

First described in detail hereinbelow is an example of the action of the image recording device 1, which is performed in order to minimize the occurrence of wrinkles in the roll paper. An example of the specific configuration of a wrinkle prevention plate for minimizing the occurrence of wrinkles in the roll paper is then described.

Example of Action of Image Recording Device 1

Figure 4:
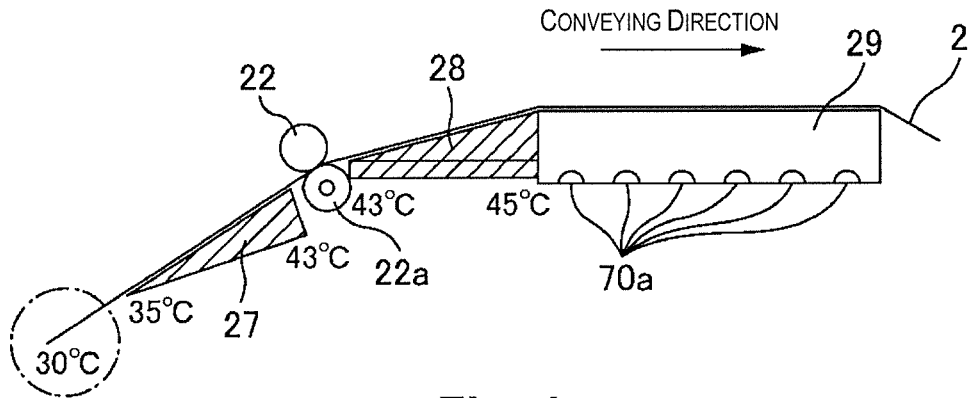
FIG. 4 is a schematic cross-sectional view showing a structural example of a wrinkle prevention plate 27, a wrinkle prevention plate 28, and a platen 29, and other components.

Next, an example of the action of the image recording device 1 is described using FIGS. 4 and 5. FIG. 4 is a schematic cross-sectional view showing an example of the configuration of the platen 29, the wrinkle prevention plates 27, 28, and other components. FIG. 5 is schematic cross-sectional view showing an example of the configuration of the wrinkle prevention plate 27.

The various actions of the image recording device 1 are carried out primarily by the controller 60. Particularly, in the present embodiment they are carried out by the CPU 62 processing the programs stored in the memory 63. These programs are configured from codes for performing various actions described hereinbelow.

When an image signal and a control signal from the host computer 110 are inputted to the controller 60 via the interface 61, the control of the unit control circuit 64 causes the heater unit 70 to conduct heat to the platen 29 by the first heater 70*a* and to conduct heat to the wrinkle prevention plate 27 by the second heater 70*b*.

In the present embodiment, the controller 60 performs control for causing the first heater 70*a* to heat the platen 29 until the temperature reaches 45° C., on the basis of a detection signal from the temperature detection sensor (not shown) provided to the platen 29. Specifically, the controller 60 performs feedback control so as to keep the temperature of the platen 29 at 45° C. The controller 60 also performs control for causing the second heater 70*b* to heat the end of the wrinkle prevention plate 27 that is downstream in the conveying direction until the temperature reaches 43° C., on the basis of a detection signal from the temperature detection sensor (not shown) provided to the wrinkle prevention plate 27. Specifically, the controller 60 performs feedback control so as to keep the temperature of the downstream end of the wrinkle prevention plate 27 at 43° C.

The platen 29 is disposed on the conveying path such that the upstream end in the conveying direction is in contact with the downstream end in the conveying direction of the wrinkle prevention plate 28. Therefore, the wrinkle prevention plate 28 can receive the heat supplied to the platen 29 b the first heater 70*a* through this end.

By receiving the heat of the platen 29 from the downstream end in the conveying direction, the wrinkle prevention plate 28 can add less heat to locations farther from the image recording area R in the region of the roll paper positioned on the wrinkle prevention plate 28. This is because in the wrinkle prevention plate 28, when heat moves from the downstream end to the upstream end in the conveying direction, heat flows out to the exterior according to the movement distance, and more heat is lost in locations further from the image recording area R. In the wrinkle prevention plate 28 in the present embodiment, the length in the conveying direction of the wrinkle prevention plate 28 is 100 mm, the temperature of the downstream end in the conveying direction is 45° C., and the temperature of the upstream in the conveying direction is 43° C., as shown in FIG. 4. The wrinkle prevention plate 28 can thereby have a temperature slope such that the temperature difference between the ends is (45° C.−43° C.=2° C.), and the occurrence of wrinkles can be prevented.

The downstream end of the wrinkle prevention plate 27 is heated by the second heater 70b, and the temperature thereof is kept at 43° C. Therefore, the wrinkle prevention plate 27 can receive the heat supplied by the second heater 70b through this end. By receiving the heat of the second heater 70b from the downstream end in the conveying direction, the wrinkle prevention plate 27 can add less heat to locations further from the image recording area R in the region of the roll paper positioned on the wrinkle prevention plate 27. This is because in the wrinkle prevention plate 27, when heat moves from the downstream end to the upstream end in the conveying direction, heat flows out to the exterior according to the movement distance, and more heat is lost in locations further from the image recording area R. In the wrinkle prevention plate 27 in the present embodiment, the length in the conveying direction of the wrinkle prevention plate 27 is 200 mm, the temperature of the downstream end in the conveying direction is 43° C., and the temperature of the upstream in the conveying direction is 35° C., as shown in FIG. 4. The wrinkle prevention plate 27 can thereby have a temperature slope such that the temperature difference between the ends is (43° C.−35° C.=8° C.), and the occurrence of wrinkles can be prevented.

The wrinkle prevention plate 27 and the wrinkle prevention plate 28 are compared here. The wrinkle prevention plate 28 has a shorter length in the conveying direction than the wrinkle prevention plate 27. This is because if the length in the conveying direction of the wrinkle prevention plate 27 is shortened, the distance between the conveying roller 22 and the platen 29 also shortens, and the conveying precision of the roll paper 2 can be increased. By increasing the length in the conveying direction of the wrinkle prevention plate 28, the temperature difference between the ends in the wrinkle prevention plate 28 can be increased. Specifically, the wrinkle prevention plate 27 has a greater temperature difference between ends than the wrinkle prevention plate 28.

The temperature difference between the ends in the wrinkle prevention plate 27 is described here. First is a description of the reason for the downstream end of the wrinkle prevention plate 27 being heated by the second heater 70b to 43° C.

This is because the temperature of the downstream end of the wrinkle prevention plate 27 is made to coincide with the temperature 43° C. of the upstream end of the platen 29. Specifically, this is because by setting the temperature in this manner, there is no longer a clear temperature division in the region of the roll paper spanning between these two ends, and the occurrence of wrinkles can be minimized.

The reason the conveying roller 22 is not heated is because the roller diameter would increase due to thermal expansion, the conveying precision of the roll paper would decrease, and it would therefore no longer possible to perform conveying control according to an appropriate conveyed amount.

Next, the reason for setting the temperature of the upstream end of the wrinkle prevention plate 27 to 35° C. is described.

Since there are numerous heat sources in the interior of the image recording device 1, the temperature of the internal atmosphere increases to 30° C. Therefore, the atmosphere of the area (shown by the circle of a single-dot line) further upstream from the upstream end of the wrinkle prevention plate 27 is also warmed to a temperature of 30° C. as shown in FIG. 4.

If the temperature of the upstream end of the wrinkle prevention plate 27 is thereupon reduced from 43° C. to 35° C., the temperature of this atmosphere can be brought near to 30° C. Specifically, this is because the temperature difference between the two ends can be reduced by setting the temperature in this manner, and there will therefore not be a clear temperature division in the region of the roll paper, and the occurrence of wrinkles can be minimized.

Next, when the controller 60 completes the process of heating with the heater unit 70, the controller 60 sequentially executes a paper-feeding process by the feeding unit 10, a conveying process by the conveying unit 20, an image printing process by the head unit 30 based on an image signal or the like from the host computer 110, and a paper ejection process by the winding unit 90.

Next, the controller 60 performs the head cleaning process at a predetermined timing. During the timeframe in which this head cleaning is being performed, the roll paper 2 continues to receive the supply of heat from the heater unit 70.

Thus, even if the roll paper 2 continues to receive the supply of heat by the heater unit 70, according to the image recording device 1 as described above, the occurrence of wrinkles in the roll paper 2 can be minimized because a wrinkle prevention plate is provided for supporting the region of the roll paper 2 positioned in an area upstream from the image recording area R on the conveying path and for heating this region, the wrinkle prevention plate being disposed in this upstream area, wherein the wrinkle prevention plate adds less heat to locations further from the image recording area R of the wrinkle prevention plate.

The following is a detailed description of an example of the configuration of a wrinkle prevention plate for minimizing the occurrence of wrinkles in the roll paper.

Example of Configuration of Wrinkle Prevention Plate

Next, a specific configuration example of the wrinkle prevention plates 27, 28 will be described using FIGS. 4 and 5.

The wrinkle prevention plate 27 is shaped so as to decrease in thickness away from the image recording area R (the platen 29) as shown in FIG. 4.

Specifically, the wrinkle prevention plate 27 has a cross-sectional shape which inclines downward toward the upstream side in the conveying direction. Therefore, by receiving the heat of the second heater 70b from the downstream end in the conveying direction as shown in FIG. 5, the wrinkle prevention plate 27 can add less heat to locations further from the image recording area R in the region of the roll paper positioned on the wrinkle prevention plate 27. This is because by increasing the heat resistance from the downstream end toward the upstream end in the conveying direction in the wrinkle prevention plate 27, the movement of heat is restricted, heat flows out to the exterior, and more heat is lost in locations further from the image recording area R. In the wrinkle prevention plate 27 in the present embodiment, the cross-sectional shape is a right triangle, the temperature of the downstream end in the conveying direction is 43° C., and the temperature of the upstream end in the conveying direction is 35° C., as shown in FIG. 4. The wrinkle prevention plate 27 thereby has a temperature slope such as the one described above, and the occurrence of wrinkles can therefore be prevented. The wrinkle prevention plate 27 is also capable of smoothly conveying the roll paper 2 because the support surface which supports the roll paper 2 is inclined. By using the second heater 70b, the amount of heat can be set to be different from the amount of heat generated by the first heater 70a, and the temperature of the downstream end of the wrinkle prevention plate 27 can be set separately.

The wrinkle prevention plate 28 is shaped so as to decrease in thickness away from the image recording area R (the platen 29) as shown in FIG. 4.

Specifically, the wrinkle prevention plate 28 has a cross-sectional shape which inclines downward toward the upstream side in the conveying direction. Therefore, by receiving the heat of the first heater 70a from the downstream end in the conveying direction via the platen 29 as shown in FIG. 4, the wrinkle prevention plate 28 can add less heat to locations further from the image recording area R in the region of the roll paper positioned on the wrinkle prevention plate 28. This is because by increasing the heat resistance from the downstream end toward the upstream end in the conveying direction in the wrinkle prevention plate 28, the movement of heat is restricted, heat flows out to the exterior, and more heat is lost in locations further from the image recording area R. In the wrinkle prevention plate 28 in the present embodiment, the cross-sectional shape is a right triangle placed on top of a rectangle, the temperature of the downstream end in the conveying direction is 45° C., and the temperature of the upstream end in the conveying direction is 43° C., as shown in FIG. 4. The wrinkle prevention plate 28 can thereby have a temperature slope such as the one described above, and the occurrence of wrinkles can therefore be prevented. The wrinkle prevention plate 28 is also capable of smoothly conveying the roll paper 2 because the support surface which supports the roll paper 2 is inclined. Heat can also be conducted without providing a separate heater to the wrinkle prevention plate 28.

The wrinkle prevention plate 28 is formed so that the size of the cross-sectional area formed when the wrinkle prevention plate is cut in a direction orthogonal to the conveying direction is as uniform as possible, and the heat resistance is also as uniform as possible; therefore, the temperature difference between the ends (45° C.−43° C.=2° C.) can be reduced.

Thus, according to the image recording device 1, a wrinkle prevention plate is provided for supporting a region of the roll paper 2 positioned in an area upstream from the image recording area R on the conveying path and for heating this region, the wrinkle prevention plate being disposed in this upstream area, wherein the wrinkle prevention plate adds less heat to locations further from the image recording area R of the wrinkle prevention plate; therefore, a temperature slope can be formed in the wrinkle prevention plate, and the occurrence of wrinkles in the roll paper 2 positioned on the wrinkle prevention plate can be minimized.

OTHER EMBODIMENTS

The present embodiment primarily described an image recording device, but an image recording method and the like are also disclosed. The present embodiment is also intended to make the present invention easier to understand and should not be interpreted as limiting the present invention. The present invention can be modified and improved without deviating from the scope thereof, and the present invention of course includes such equivalents. Particularly, the embodiments described hereinbelow are included in the present invention as well.

Wrinkle Prevention Plate

In the embodiment described above, an example was described of an image recording device 1 which used a wrinkle prevention plate 27 and a wrinkle prevention plate 28 disposed to either side of the conveying roller 22, but the present invention is not limited thereto.

Figure 6:
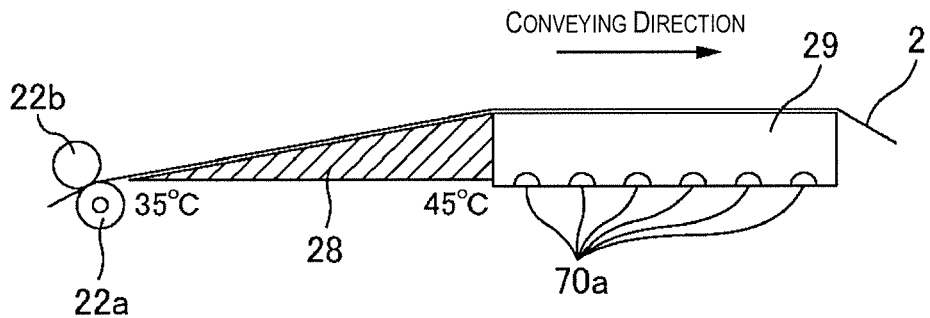
FIG. 6 is a schematic cross-sectional view showing another structural example of the wrinkle prevention plate 28.

For example, the image recording device 1 may use the wrinkle prevention plate 28 alone. Specifically, the length in the conveying direction of the wrinkle prevention plate 28 is set to 200 mm as an example, and the wrinkle prevention plate 28 is placed between the conveying roller 22 and the platen 29, as shown in FIG. 6. The end of the wrinkle prevention plate 28 that is downstream in the conveying direction is in contact with the platen 29. Through this end, the wrinkle prevention plate 28 receives the heat supplied to the platen 29 by the first heater 70a. The temperature of the downstream end in the conveying direction of the wrinkle prevention plate 28 can thereby be 45° C., and the temperature of the upstream end in the conveying direction can be 35° C. Therefore, the wrinkle prevention plate 28 can have a temperature slope such that the temperature gradually changes from high to low toward the upstream side in the conveying direction, and the region in the roll paper 2 where a clear temperature division occurs can be reduced. As a result, the occurrence of wrinkles of the roll paper can be minimized.

In the embodiment described above, an example was described of wrinkle prevention plates which had cross-sectional shapes of right triangles or the like, but the present invention is not limited thereto.

Conveying Path

In the embodiment described above, an example was described of an image recording device which had a conveying path formed by placing the rollers, the platen, and other components as shown in FIG. 1, but the present invention is not limited thereto. Specifically, the conveying path in the present invention includes conveying paths formed by altering the placement of the rollers and other components, the quantities, and other features.

Image Recording Device

In the embodiment described above, an example was described of an inkjet printer as an image recording device, but the image recording device may also be one that discharges a liquid other than ink (including liquid substances in which particles of a functional material are dispersed or mixed in liquid, and fluid substances such as gels).

The image recording device of the embodiment described above may be provided with a suction unit for holding the roll paper 2 to the support surface of the platen 29 by suction. An electrostatic suction unit may also be provided for holding the roll paper 2 to the support surface of the platen 29 by electrostatic suction.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image recording device comprising:
a conveying part configured and arranged to convey a medium along a conveying path;
a first medium support part configured and arranged to support a region of the medium positioned in an image recording area on the conveying path and to heat the region;
a second medium support part disposed in an upstream area from the image recording area with respect to a conveying direction of the medium, and configured and arranged to support an upstream region of the medium positioned in the upstream area and to heat the upstream region; and
a temperature control part configured and arranged to control a temperature of the first medium support part and a temperature of the second medium support part so that the temperature of the second medium support part corresponding to the upstream region is lower than the temperature of the first medium support part corresponding to the region, wherein
an upstream end in the conveying direction of the first medium support part is in contact with a downstream end in the conveying direction of the second medium support part.

2. The image recording device according to claim 1, wherein
the second medium support part is configured and arranged to apply less heat to locations separated further from the image recording area.

3. The image recording device according to claim 2, further comprising
a heat supply part configured and arranged to supply the first medium support part with heat to be applied to the medium by the first medium support part,
the second medium support part having a downstream end part disposed on a downstream side with respect to the conveying direction of the medium, the downstream end part contacting the first medium support part to receive heat supplied to the first medium support part by the heat supply part to heat the medium by the second medium support part.

4. An image recording device comprising:
a conveying part configured and arranged to convey a medium along a conveying path;
a first medium support part configured and arranged to support a region of the medium positioned in an image recording area on the conveying path and to heat the region;
a second medium support part disposed in an upstream area from the image recording area with respect to a conveying direction of the medium, and configured and arranged to support an upstream region of the medium positioned in the upstream area and to heat the upstream region;

a temperature control part configured and arranged to control a temperature of the first medium support part and a temperature of the second medium support part so that the temperature of the second medium support part corresponding to the upstream region is lower than the temperature of the first medium support part corresponding to the region;
a heat supply part configured and arranged to supply the first medium support part with heat to be applied to the medium by the first medium support part; and
a third medium support part,
the second medium support part being configured and arranged to apply less heat to locations separated further from the image recording area, and the second medium support part having a downstream end part disposed on a downstream side with respect to the conveying direction of the medium, the downstream end part contacting the first medium support part to receive heat supplied to the first medium support part by the heat supply part to heat the medium by the second medium support part,
the conveying part having a pair of conveying rollers disposed upstream of the image recording area with the conveying rollers being respectively disposed above and below the medium, and
the third medium support part being disposed in an opposite area that is opposite from the second medium support part with respect to the conveying rollers, and configured and arranged to support an opposite region of the medium positioned in the opposite area to heat the opposite region, the third medium support part being configured and arranged to apply less heat to locations separated further from the image recording area.

5. The image recording device according to claim 4, further comprising
an additional heat supply part configured and arranged to supply the third medium support part with heat to be applied to the medium by the third medium support part, the additional heat supply part being a different heat supply part from the heat supply part, and
the third medium support part being configured and arranged to heat the medium by receiving the heat supplied by the additional heat supply part from a downstream end with respect to the conveying direction.

6. The image recording device according to claim 5, wherein
a temperature difference between a downstream end and an upstream end in the conveying direction in the third medium support part is greater than a temperature difference between a downstream end and an upstream end in the conveying direction in the second medium support part.

7. The image recording device according to claim 4, wherein
the second medium support part and the third medium support part are shaped so as to progressively decrease in thickness away from the image recording area.

8. The image recording device according to claim 4, wherein
the conveying part has a mechanism configured and arranged to slacken and convey the medium in an area upstream of the third medium support part in the conveying path.

9. An image recording method comprising:
recording an image on a medium using an image recording device including
a conveying part configured and arranged to convey a medium along a conveying path, a first medium support part configured and arranged to support a region of the medium positioned in an image recording area on the conveying path and to heat the region, and a second medium support part disposed in an upstream area from the image recording area on the conveying path, and configured and arranged to support an upstream region of the medium positioned in the upstream area and to heat the upstream region so that a temperature of the second medium support part corresponding to the upstream region is lower than a temperature of the first medium support part corresponding to the region wherein an upstream end in the conveying direction of the first medium support part is in contact with a downstream end in the conveying direction of the second medium support part.

* * * * *